Nov. 9, 1937.  W. L. FRY  2,098,684
SLIP COVER
Filed Aug. 27, 1937   9 Sheets-Sheet 1

Inventor
Walter L. Fry
By
Williams, Bradbury, McCaleb & Hinkle Attys

Nov. 9, 1937.    W. L. FRY    2,098,684
SLIP COVER
Filed Aug. 27, 1937    9 Sheets-Sheet 2

Nov. 9, 1937.  W. L. FRY  2,098,684
SLIP COVER
Filed Aug. 27, 1937  9 Sheets-Sheet 3

Inventor
Walter L. Fry.
By
Williams, Bradbury, McCaleb & Hinkle Attys

Nov. 9, 1937.   W. L. FRY   2,098,684
SLIP COVER
Filed Aug. 27, 1937   9 Sheets-Sheet 5

Inventor
Walter L. Fry
By Williams, Bradbury, McCaleb & Hinkle Attys

Nov. 9, 1937.  W. L. FRY  2,098,684
SLIP COVER
Filed Aug. 27, 1937  9 Sheets-Sheet 6

Nov. 9, 1937.    W. L. FRY    2,098,684
SLIP COVER
Filed Aug. 27, 1937    9 Sheets-Sheet 7

Inventor
Walter L. Fry
By Williams, Bradbury, McCaleb + Hinkle
Attys.

Nov. 9, 1937.  W. L. FRY  2,098,684
SLIP COVER
Filed Aug. 27, 1937  9 Sheets-Sheet 8

Inventor
Walter L. Fry
Williams, Bradbury, McCaleb & Hinkle Attys.

Nov. 9, 1937.  W. L. FRY  2,098,684
SLIP COVER
Filed Aug. 27, 1937  9 Sheets-Sheet 9

Inventor
Walter L. Fry
By
Williams, Bradbury, McCaleb & Hinkle Attys

Patented Nov. 9, 1937

2,098,684

UNITED STATES PATENT OFFICE 2,098,684

SLIP COVER

Walter L. Fry, Bloomfield Hills, Mich.

Application August 27, 1937, Serial No. 161,248

11 Claims. (Cl. 155—182)

My invention relates to slip covers for chairs, lounges, davenports and similar articles of furniture which are of irregular shape and which are partially or completely upholstered, and to the method of making such slip covers.

This application is a continuation in part of my prior applications, Serial Numbers 119,768, 119,766, 124,388 and 124,389.

Upholstered articles, such as chairs, lounges, davenports, etc. are made in innumerable sizes, shapes, proportions and designs and heretofore it has been impossible satisfactorily to manufacture, by quantity production methods, slip covers for such articles, because the slip covers heretofore known have been incapable of distortion adequate to compensate for the differences in shape, size, proportions and styles of such articles. It has therefore been the practice heretofore to tailor-make such slip covers for the individual articles of furniture or to manufacture them in numerous shapes, sizes and styles, each particular shape, size and style being limited to a small quantity and being suitable for application to a particular size, shape, proportion and style of article or extremely limited variations thereof.

An object of my invention is to provide a slip cover which may be economically made in large quantities and which is resiliently distortable whereby it will readily adapt itself to a large variety of shapes, sizes, proportions and styles of upholstered articles, to fit the same snugly and smoothly and thereby produce a neat and attractive appearance.

Another object is to provide a slip cover which is inherently resilient and distortable and which may be made of any of the usual textile materials and substitutes therefor, or any desired mixtures of such materials.

Another object of my invention is to provide a slip cover which will adhere closely to the article to which it is applied and which will resist creeping or slipping relative to such article.

Another object is to provide a slip cover which may be made of a fabric having any desired color or pattern.

Another object is to provide a yieldingly distortable slip cover which may be washed or dry-cleaned.

Another object is to provide a resiliently distortable slip cover which is durable and serviceable and which will retain its original characteristics throughout a long period of use.

Another object is to provide a slip cover which may be easily and quickly applied and removed by unskilled persons.

Another object is to provide a slip cover which is adapted to be retained in place by the resiliency of the article to which it is applied.

Another object is to provide a slip cover of such design that any excess material may be easily and unobtrusively disposed of during the application of the slip cover to an article of furniture.

Another object is to provide a slip cover of such design that the re-entrant angles formed between adjacent portions of an upholstered article are utilized as storage space for excess slip cover material.

Another object is to provide a slip cover comprising a prefabricated envelope of resiliently deformable material which will automatically conform itself to the varying contours of upholstered articles.

Another object of my invention is to provide a slip cover having improved means for securing it to an article of furniture.

Another object of my invention is the provision of a slip cover having improved means for more easily varying the tension on various parts of the slip cover.

Another object is to provide a knitted slip cover which may be economically manufactured in large quantities and which will automatically conform itself to a wide variety of sizes, styles and shapes of furniture.

Another object is to provide a slip cover having elastic rubber reinforcing elements positioned along the lower edges to permit more ready application to pieces of furniture having legs positioned at different distances from one another and having fronts of different heights.

Another object of my invention is to provide a slip cover having elastic rubber reinforcing elements positioned in such manner along the lower edges of the cover that these edges may be rolled inwardly to dispose of surplus material.

Another object of my invention is to provide a knitted slip cover which can be made in three simple styles to cover practically all sizes, shapes and styles of upholstered and semi-upholstered chairs in use.

Other objects and advantages will become apparent as the description proceeds.

Figure 1:
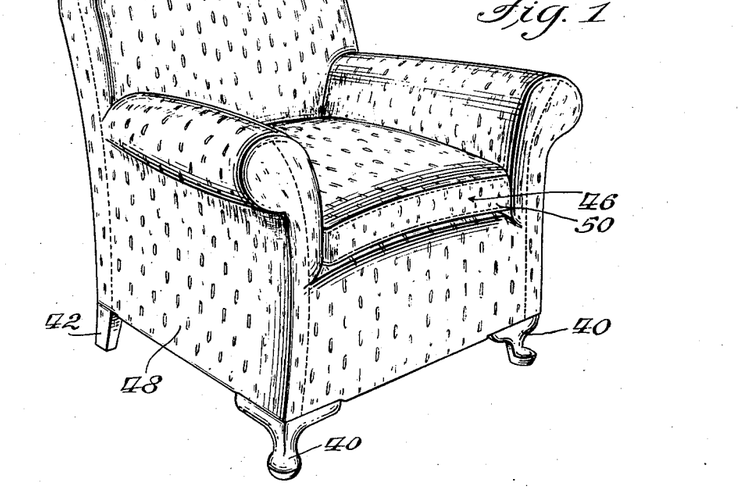
Figure 1 is a perspective view of the front of a well known style of chair to which my slip cover has been applied.
Figure 2:
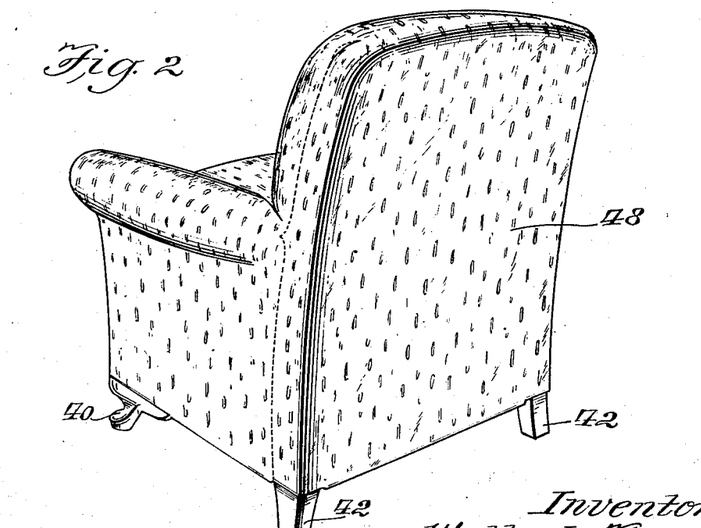
Figure 2 is a perspective view showing the rear of the chair and slip cover of Figure 1.
Figures 3, 4, 5:
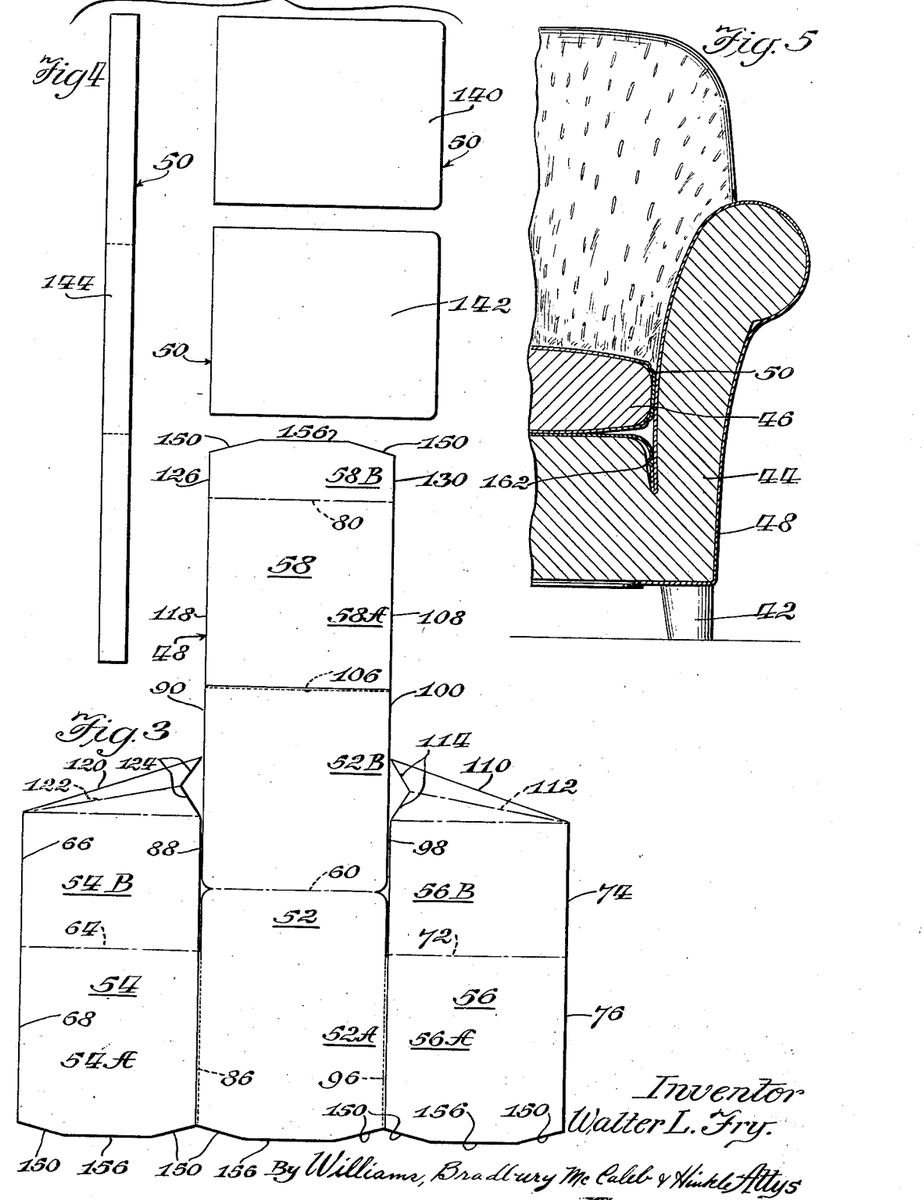
Figure 3 is a view showing the method of manufacturing my slip cover.
Figure 4 is a view showing the method of manufacturing the slip cover for a separable seat cushion.
Figure 5 is a partial transverse vertical section through the chair and slip cover shown in Figures 1 and 2.

Referring particularly to Figures 1, 2 and 5 of the drawings, I have disclosed therein a conventional style of chair having a wooden frame including front legs 40 and rear legs 42, the main portion of the frame being enclosed in any suitable upholstery material 44. The particular chair shown in these figures is further provided with a separate seat cushion 46 which may be made of any conventional material. My novel slip cover is shown as being applied to this chair and comprises an envelope 48 which is fitted over and conforms closely to the upholstery material 44 of the chair and a separate knitted envelope 50 which encloses the seat cushion 46. It will be understood that where my slip cover is applied to a chair or other article of furniture which is not provided with a separate seat cushion, the envelope 50 may be dispensed with.

As shown most clearly in the diagrammatic view, Figure 3, the knitted envelope 48 is preferably formed of four separate pieces of fabric. The piece 52 covers the back of the chair and has a portion 52A which covers the rear of the back and a portion 52B which covers the front of the back. A second piece 54 covers the right hand arm and has a portion 54A which covers the outside of the arm and a portion 52B which covers the inside of this arm. A third piece 56 covers the left hand arm and has a portion 56A which covers the outside of this arm and a portion 56B which covers the inside of this arm. The fourth piece of fabric 58 has a portion 58A which covers the seat of the chair and a portion 58B which covers the front of the chair below the seat.

Figure 6:
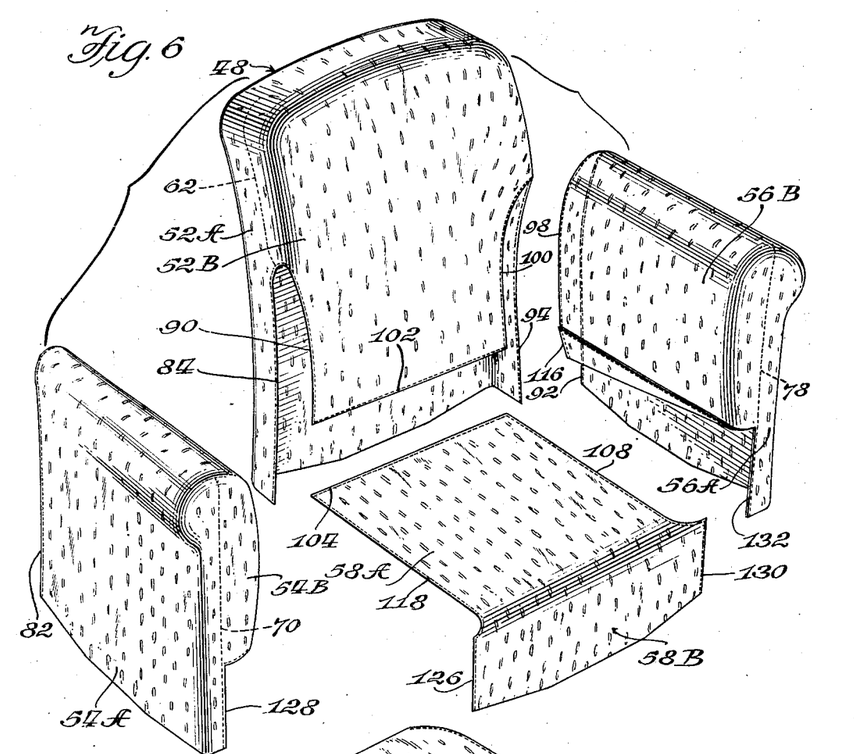
Figure 6 is an exploded view showing the distorted shapes assumed by the sections of the slip cover when applied to a chair like that shown in Figure 1.

The exploded view, Figure 6, clearly shows the manner in which these four pieces of fabric are folded in order to cover the various portions of the chair. The piece 52 is folded about the line 60, Figure 3, and the adjacent edges of the portions 52A and 52B are sewed together for a part of their length as indicated at 62, Figure 6. The piece 54 is likewise folded upon itself along the line 64 and the edges 66 and 68 are sewed together as indicated at 70, Figure 6.

The piece 56 which covers the left-hand arm is similarly folded at 72 and the adjacent edges 74 and 76 are sewed together as indicated at 78, Figure 6. The piece 58 which covers the seat and front of the chair is folded along the line 80 of Figure 3.

The edge 82 of the arm portion 54A is sewed to the edge 84 of the back portion 52A as best indicated at 86 in Figure 3, and the edge 88 of the associated arm portion 54B is sewed to the edge 90 of the back portion 52B.

Similarly, the edge 92 of the arm portion 56A is sewed to the edge 94 of the back portion 52A as indicated at 96 in Figure 3, and the edge 98 of the arm portion 56B is sewed to the edge 100 of the back portion 52B.

The lower edge 102 of the back portion 52B is sewed to the edge 104 of the seat portion 58A as most clearly indicated at 106 in Figure 3. The edge 108 of seat portion 58A is sewed to the edge 110 of arm portion 56B. In the particular style of slip cover shown, the edge 110 forms one edge of a triangular section which constitutes a continuation of the arm portion 56B. This triangular section is folded back upon itself along the line 112 and the edges 114 of this triangular section are sewed together as indicated at 116 in Figure 6 to form a pocket provided for a purpose which I shall later describe. The edges 114 when thus sewed together, form an integral part of the edge 98 which is sewed to the edge 100 of the back portion 52B.

The edge 118 of the seat portion 58A is sewed to the edge 120 of the triangular section forming an integral continuation of the arm portion 54B. This triangular section is also folded back upon itself along the line 122 and its edges 124 stitched together to form a pocket similar to that formed by the other arm portion.

The edge 126 of the front portion 58B is sewed to the edge 128 of arm portion 54A and the other edge 130 of front portion 58B is similarly sewed to the edge 132 of arm portion 56A.

All of the seams connecting the various edges of the fabric pieces 52, 54, 56 and 58, are preferably made with a type of stitch which will permit stretching or other distortion of the seams. A type of resilient stitch which is attractive, strong and protects the edges of the fabric and which I have found to be particularly desirable for this purpose, is the over-lap stitch illustrated in Figures 20 and 21. By using a slip cover comprising an envelope formed of all knitted fabric and wherein the edges of the fabric are connected by a type of stitching which permits stretching and other distortion of the knitted fabric, I provide a slip cover which is resiliently and uniformly distortable in all directions and which is self-conforming to the particular shape of the chair to which the cover is applied. It will be understood that my novel slip cover can be applied to the chair by tacking or any other suitable means.

Figure 7:
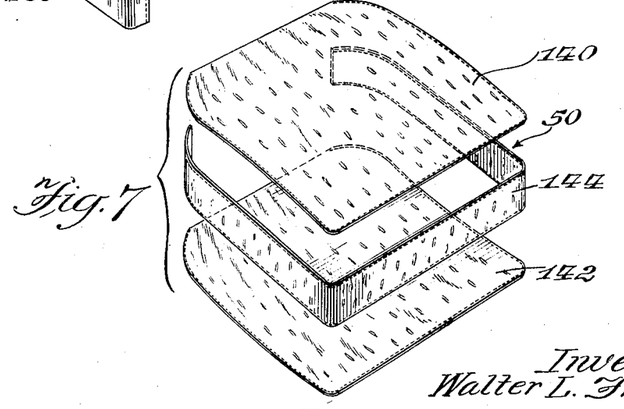
Figure 7 is a similar view of the cover for the seat cushion.

The knitted envelope 50 which encloses the separate seat cushion 46 is best shown in Figures 4 and 7. This envelope comprises knitted pieces 140 and 142 forming the top and bottom portions of the completed envelope and a knitted strip 144 forming the edge portion of this envelope. The strip 144 is folded into a substantially U-shape and the upper U-shaped edge is sewed to three edges of the top piece 140 and the lower U-shaped edge is sewed to the corresponding three edges of the bottom piece 142 to form an open ended sack or envelope of the type indicated in Figure 7. The open end of the seat cushion envelope 50 is preferably gathered together in any appropriate manner such as by sewing thereto a rubber elastic tape while in the stretched condition so that this envelope 50 may be placed around a seat cushion 46 and conform itself closely thereto. It will be understood that the seams of the envelope 50 are preferably formed by a type of stitch which permits stretching and other distortion of the knitted fabric of the envelope.

Figure 8:
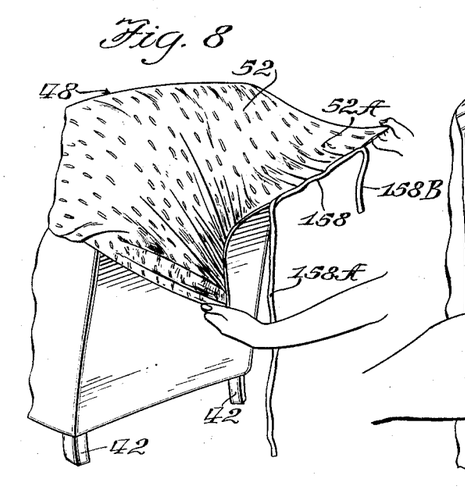
Figures 8 to 19 inclusive show the preferred manner of applying my slip cover to a chair like that shown in Figure 1.
Figure 9:
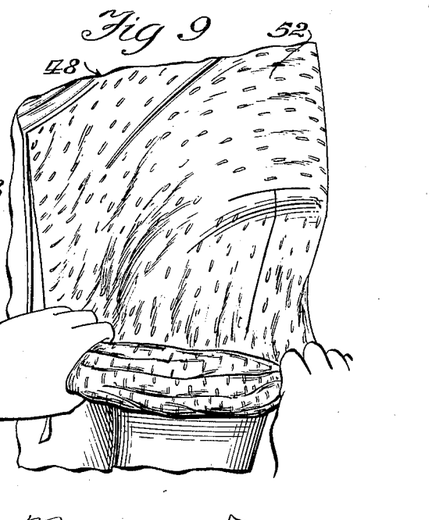

My novel slip cover may be easily and perfectly applied by a woman who has no knowledge of upholstering and without the use of any special tools. The preferred manner of applying my slip cover is shown in Figures 8 to 19 inclusive. Figure 8 shows the first step in which the woman stands behind the chair and grasps the bottom edge of the back portion 52A and pulls this edge over the back of the chair until this edge is approximately level with the bottom of the chair back. She then moves to one side of the chair and fits the slip cover over one corner of the chair back, as clearly illustrated in Figure 9. After she has properly fitted the slip cover over one corner of the chair back, she moves to the other side of the chair and fits the slip cover over the other corner of the chair back. In thus fitting the slip cover over the corners of the chair back, the portions of the slip cover which fit over these corners and over the top of the chair back, are pulled out of their original shape and are distorted until they conform exactly to the shape of the upper edge and corners of the chair back. The nature and extent of this distortion of the knitted fabric is clearly apparent from a comparison of the chair conforming shape assumed by the piece 52A as shown in Figure 6, as contrasted with the original shape of this piece 52 as shown in Figure 3.

Figure 10:
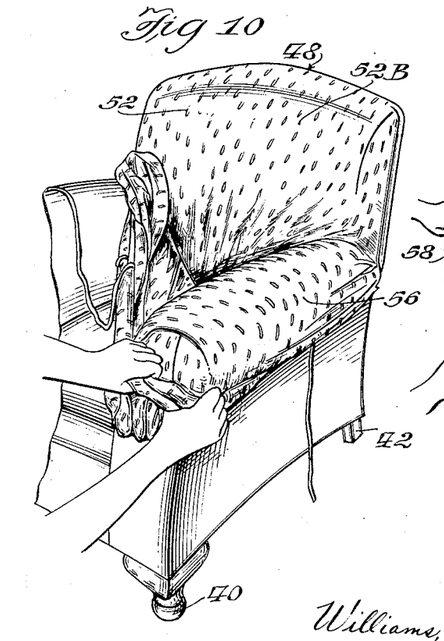
Figure 11:
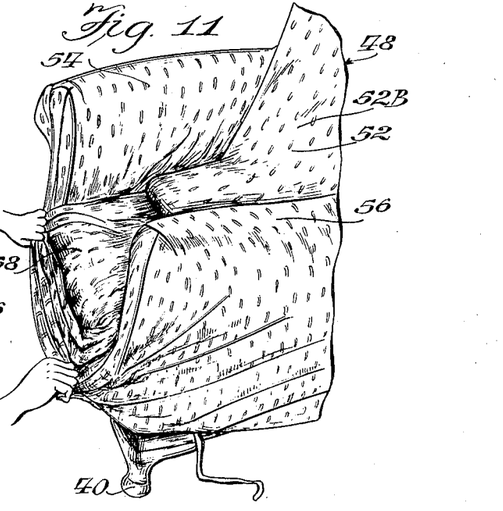

After the slip cover has been fitted over the top and corners of the chair back, she moves to a position in front of the chair and draws the slip cover down over first one chair arm and then the other chair arm as illustrated in Figure 10. She then draws the bottom part of the slip cover down around the entire base of the chair on all four sides in the manner indicated in Figure 11.

Figures 12, 13:
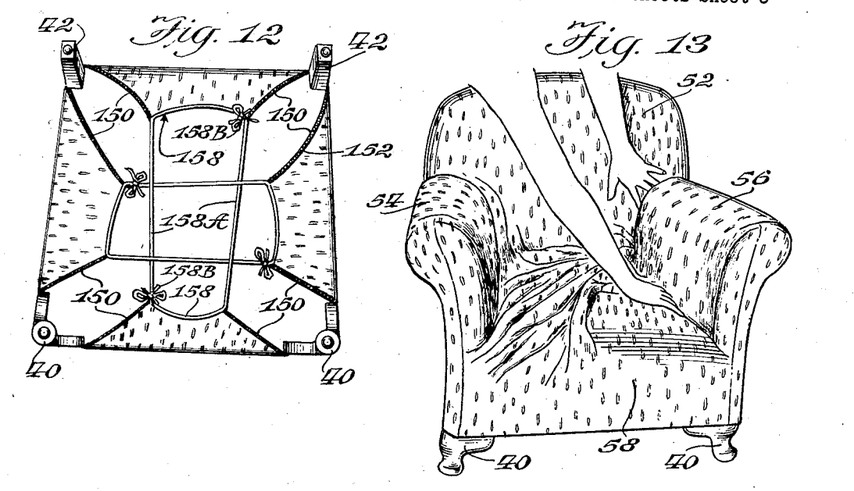

The chair is then turned over as shown in Figure 12 and the bottom edges of the slip cover secured to the chair. In the particular embodiment of the slip cover here illustrated, the cut-out corners 150 are bound with flat rubber elastic tape 152 (note also Figures 3 and 20) which is sewed to the cut-out corners while the fabric of the corners is in normally extended condition and while the tape 152 is stretched. The tape 152 is preferably stitched to the knitted fabric by a stretchable overlap stitch like that shown at 154. When the tape 152 is thereafter released, it contracts and forms gathers in the knitted fabric at these corners.

Figures 20, 21, 22, 23, 24:
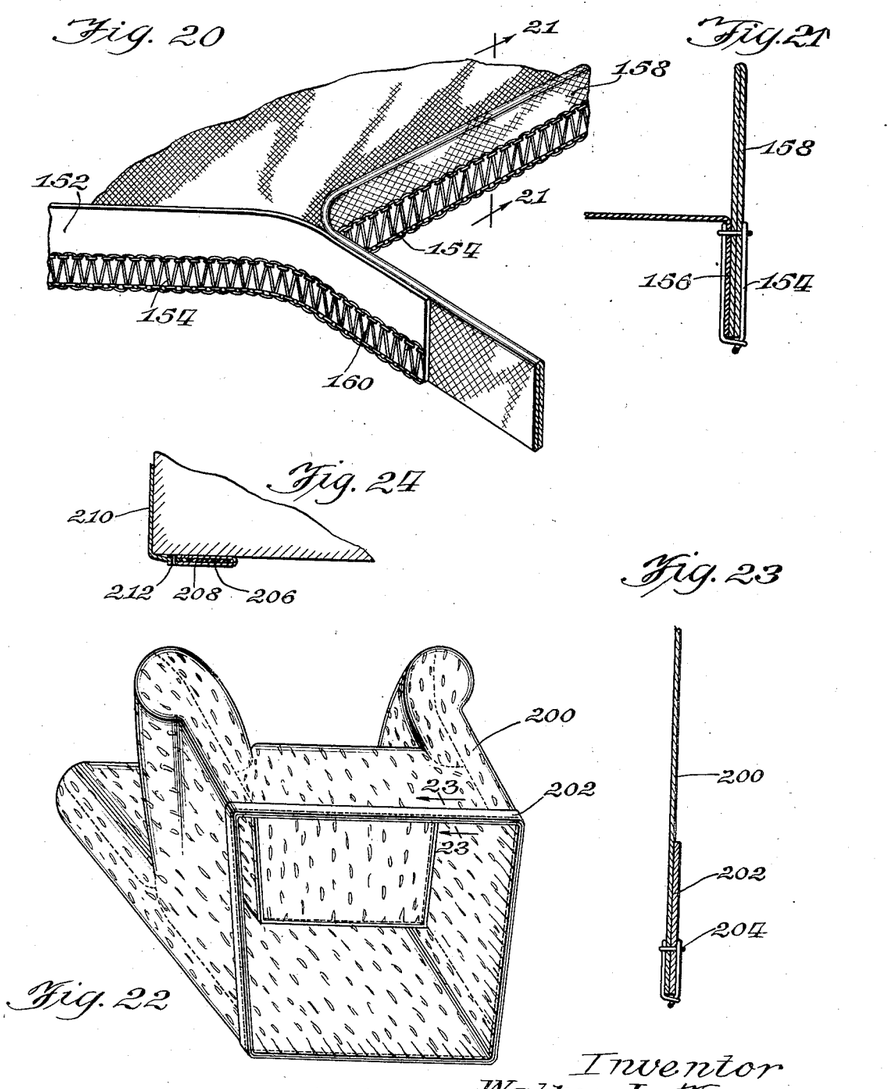
Figure 20 is a detailed view showing the manner in which the rubber elastic strips and tie strings are attached to the lower edge of the knitted fabric of the slip cover in the preferred embodiment.
Figure 21 is a sectional view taken on the line 21—21 of Figure 20.
Figure 22 shows a modified arrangement for holding the slip cover in place on the chair.
Figure 23 is a section taken on the line 23—23 of Figure 22.
Figure 24 is an alternative form of the structure shown in Figures 22 and 23.

The straight edges 156 intermediate the cut-out corners 150, are attached to flat tie strings 158 in the manner best shown in Figures 20 and 21. Each tie string 158 has a long end 158A and a short end 158B, a long end of one tie string being opposite the short end of the oppositely disposed tie string as clearly shown in Figure 12, so that there can be no confusion in securing together the proper tie strings. In order to provide the maximum strength and durability for my slip cover, I preferably directly attach each end of each rubber tape 152 to its associated tie string as indicated at 160 in Figure 20. In this manner the pull of the tie strings is directly transmitted to the rubber tapes 152.

Referring again to Figure 12 it will be noted that the chair legs are located in the cut-out corners of the slip cover and that the bottom portion of each side of the slip cover is secured by two tie strings to the bottom portion of the opposite side of the slip cover. Furthermore, the cut-out corners between adjacent tie strings are pulled tightly about the chair legs and adjacent portions of the chair by the rubber tapes 152.

The chair is next returned to upright position as shown in Figure 13 and the surplus material of the slip cover in and around the chair arms is forced into the re-entrant angles formed between a chair arm and the chair seat, or between a chair arm and the chair back. The knitted fabric of the slip cover is drawn tightly over the chair arm so that it conforms perfectly to the shape of this arm and all excess material is tucked into these re-entrant angles. The pockets formed by the triangular portions of the arm pieces 54 and 56 provide an adequate amount of material to be thus tucked in, even when my cover is applied to a large chair.

The manner in which the slip cover is tucked into the re-entrant angle between the left-hand chair arm and the chair seat, is clearly illustrated in Figure 5. This is typical of the manner in which the material is tucked into all of the re-entrant angles provided by the chair. It will be noted in this figure that the seam indicated at 162 which connects the arm portion 54 with the seat portion 58 is on the under side of the envelope forming the slip cover and is therefore concealed even when the slip cover is removed from a chair. This is typical of the preferred arrangement of all seams in the slip cover.

Figure 14:
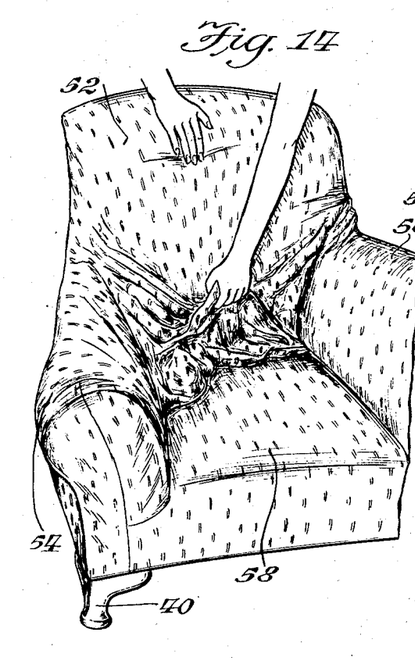
Figure 15:
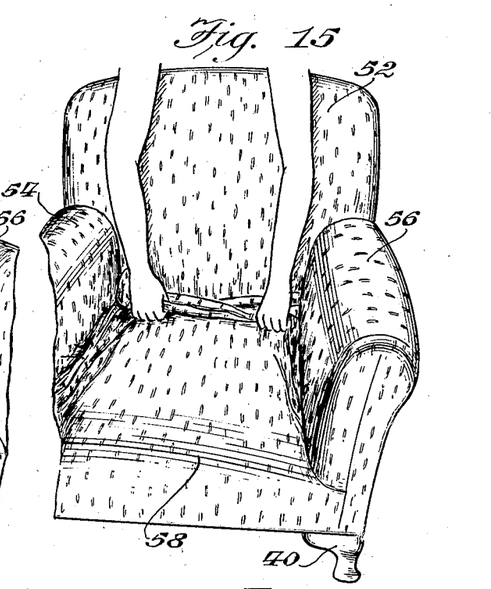

The part of the slip cover which covers the back of the chair is next drawn down smoothly as shown in Figure 14, so that the slip cover fits the back of the chair smoothly and evenly and the excess material is forced into the re-entrant angles formed between the chair back and the arms and seat. The surplus material in the chair seat is then drawn tightly back as shown in Figure 15 and the excess is tucked into the re-entrant angle formed between the base of the chair back and the chair seat. When this is completed, the slip cover will conform perfectly to the contour of the chair back, arms and seat.

Figure 16:
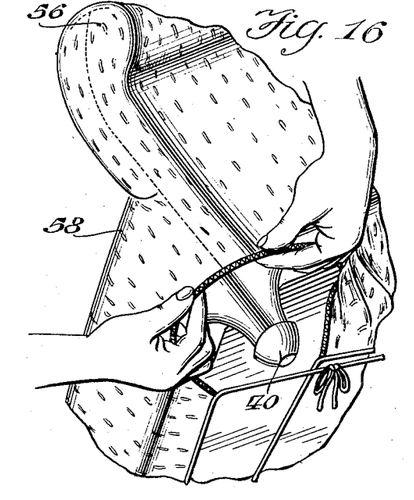
Figure 17:
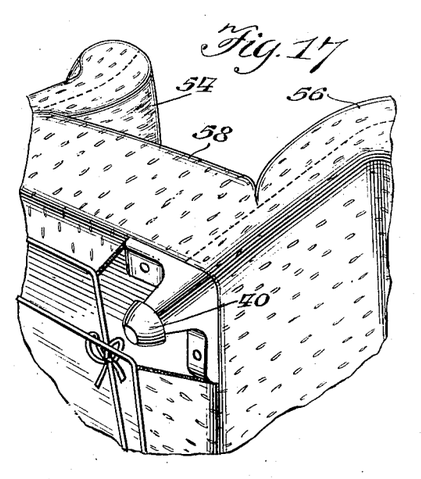
Figures 18, 19:
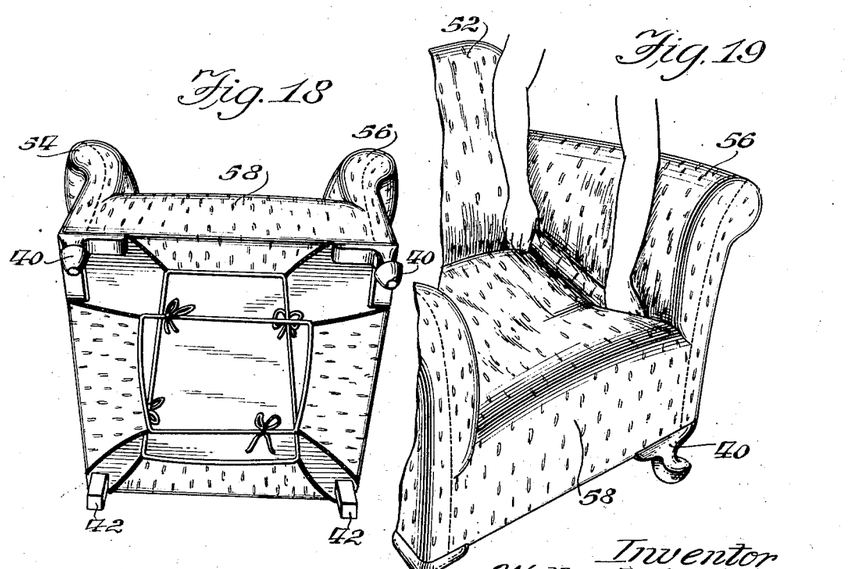

In Figure 16 the cut-out corner of the slip cover is shown as extending below the top of the chair leg and the woman is rolling under the elastic tape and the associated edge of the slip cover to shorten it at this point. When properly rolled, the cut-out corners of the slip cover fit perfectly about the chair legs as shown in Figures 17 and 18 and as also shown in Figures 1 and 2.

After the slip cover has been completely fitted to the chair in the manner described, it may be desirable to again turn the chair over and tighten the tie strings which hold the slip cover in place.

A further comparison of Figures 3 and 6 again emphasizes the distortion which has taken place in the knitted fabric in thus applying it to the style of chair shown in the drawings. I wish particularly to call attention to the distortion of the fabric where it fits over the top and corners of the back, the top and ends of the arms, and the front portion of the chair below the seat. Because the fabric is knitted, it is capable of this distortion and is inherently resilient so that it automatically conforms itself perfectly to the contour of the chair. Furthermore, these characteristics are not necessarily present in the individual threads of which the fabric is made; wherefore the fabric can be formed of any of the usual textile materials, such as silk, wool, cotton, linen, or various mixtures thereof, or of artificial textiles such as rayon. This is an important advantage, in that it provides a slip cover which may be washed or dry-cleaned in any usual manner.

The knitted fabric of which my slip cover is formed further has the advantage of tending to adhere to the fabric cover of the upholstery of the chair. This feature aids in preventing creeping of the slip cover relative to the chair so that the perfect fit of the slip cover is maintained despite severe usage. It will further be noted that the tucked-in portions of the slip cover are gripped between adjacent portions of the upholstery material of the chair and that the resilience of this upholstery material also serves as a means for securing the slip cover in place.

For certain purposes, it is desirable to secure the tucked-in portions of the slip cover in place more firmly by pushing paper tube dowels into the re-entrant angles between the seat cushion and arms and the seat cushion and back as illustrated in Figure 19. For most purposes, however, such dowels are unnecessary.

From the foregoing description, it will be apparent that the envelope 48 for covering the chair, constitutes a single unitary structure composed entirely of knitted material which is uniformly and universally resilient and distortable. Furthermore, the seams used to connect the several pieces of knitted fabric are of such nature that they do not interfere with these characteristics of the knitted material. It will be appreciated that the fold lines shown in Figure 3 and described in the specification, do not appear in the completed envelope and have been referred to merely as a matter of convenience. The completed envelope is thus fully capable of conforming perfectly to a wide variety of styles, shapes and sizes of chairs.

In fact, I have found that by making my novel slip cover in three styles only, each style being limited to a single size, I can cover over fifty-seven different sizes, styles and designs of upholstered and partially upholstered chairs. This includes practically every size, style and design of upholstered and partially upholstered chair now in use.

In Figures 22 and 23 I have shown a modified form of my invention. In Figure 22 I have shown a knitted slip cover 200, having a continuous uniform lower edge to which is attached a flat rubber elastic tape 202 as by overlap stitching 204.

In this form of my invention the corners are not cut out as they are in the modification first described. When the embodiment of Figures 22 and 23 is applied to a chair, the lower edge of the cover, including the rubber tape 202, will either be folded beneath the body of the chair, or will be rolled up so that the tape 202 is invisible and the bottom of the knitted fabric of the slip cover will closely fit that portion of the chair immediately above the legs. In other words, the bottom of the slip cover will be rolled under in the same manner in which the corners of the first embodiment were rolled under, as shown most clearly in Figures 16 and 17. When the lower edge of the embodiment of Figure 22 is rolled under, it will fit about the entire bottom edge of the chair in the same manner in which the cover of the first embodiment fits above the legs as shown, for example, in Figure 17.

Figure 24 is a detail showing a further modification in which the rubber elastic strip 206 is carried in the pocket provided by a separate edging 208 secured to the lower edge of the slip cover 210 by stitching 212. In this figure the slip cover is indicated as being applied to a chair in which the base of the chair extends outwardly beyond the legs and this figure clearly indicates the manner in which the rubber tape 206 pulls inwardly on the lower edge of the slip cover and holds it firmly in place about the base of the chair.

Figures 25, 26, 27, 28, 29:
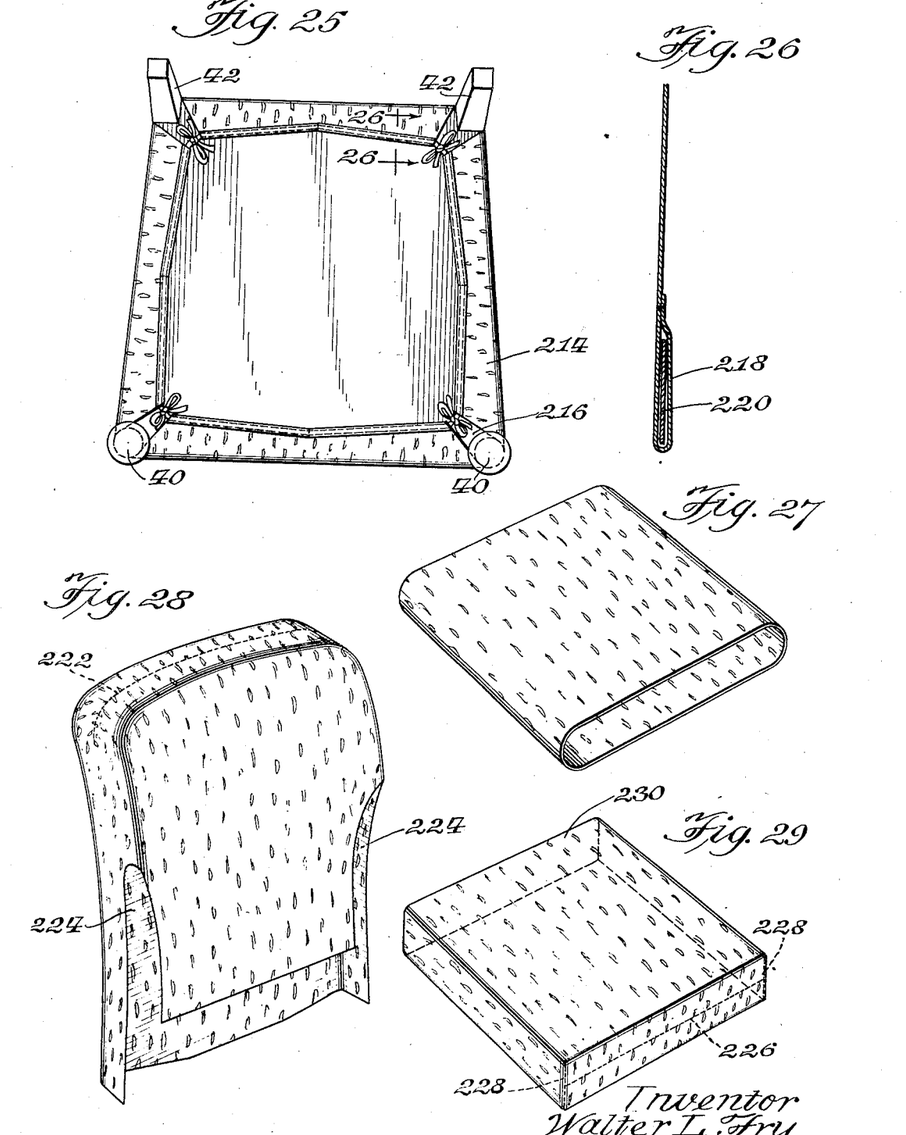
Figure 25 shows another modified form of securing means for holding the slip cover in place.
Figure 26 is a section taken on the line 26—26 of Figure 25.
Figure 27 shows a section of tubular knitted fabric adapted to form a part of a slip cover.
Figure 28 shows the manner in which that portion of the slip cover which encloses the back of the chair is formed from a piece of tubular fabric.
Figure 29 shows the manner in which a cover for a seat cushion is formed from a piece of tubular knitted fabric.

Figures 25 and 26 show another embodiment of my invention in which the lower corners of the knitted slip cover 214 are cut out as indicated at 216 to accommodate the legs of the chair. The lower edges of the slip cover intermediate the cut-out corners 216 are turned over to form hems 218 in which are located tie strings 220 which for most purposes are formed of non-stretchable tape, although they may be made of rubber elastic if desired. In this form of my invention the adjacent ends of the tie strings in adjacent lower edges, are secured together as clearly indicated in Figure 25, in lieu of securing opposite tie strings to each other as shown, for example, in Figure 12.

It will be noted that wherever I have used either rubber tapes or non-stretchable tapes for any purpose whatsoever, I have indicated these tapes as being flat instead of round, since I have found that flat tapes may be attached to the fabric of the slip cover more easily, are less bulky, and provide a neater appearance. For the same reason, I prefer to use flat rubber elastic tapes in lieu of coil springs. It is to be understood, however, that my invention is not limited to the use of such flat tapes.

Knitted fabric is commonly made in tubular form and in some instances I find it advantageous to save stitching by utilizing the fabric in tubular sections. In Figure 27 I have illustrated a tubular section of knitted fabric suitable for use either as the back portion of the slip cover or as the cover for a separate seat cushion.

In Figure 28 I show a tubular section like that illustrated in Figure 27, made up in the form of the back portion of a slip cover. In this figure the upper open end of the tubular section is sewed together as indicated at 222 to form the part of the cover which extends over the upper end of the back of the chair. The lower sides of the tubular fabric are slitted as indicated at 224 to provide edges suitable to be sewed to the adjacent edges of the portions of the slip cover which fit over the chair arms. A comparison of Figure 28 with Figure 6 clearly indicates that the portion of the slip cover shown in Figure 28 may be used in lieu of the corresponding portion shown in Figure 6.

The cover for a separate seat cushion shown in Figure 29 indicates a preferred manner in which such a cover can be formed from a section of tubular fabric like that shown in Figure 27. In Figure 29 one end of the section of tubular fabric is sewed together as indicated at 226. In order to provide the most attractive corners, I preferably cut away the corners of the flattened tube on an angle and then sew these cut-away corners together as indicated at 228. This provides a practically rectangular corner. The open end 230 through which the seat cushion is inserted may be provided with a rubber elastic tape or tie string or other suitable means to aid in preventing displacement of the cover from the seat cushion.

Figure 30:
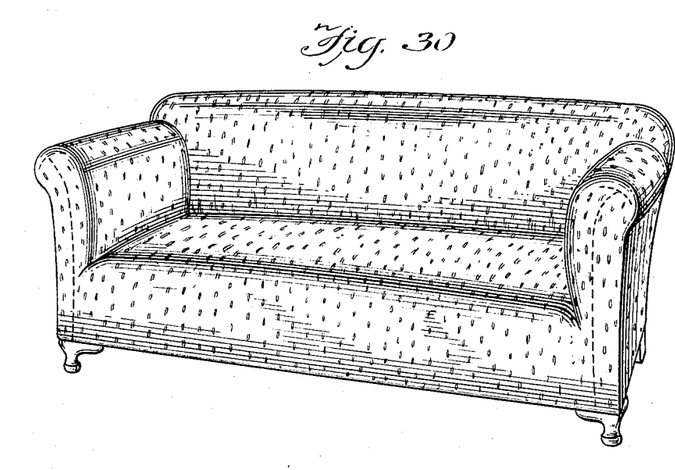
Figure 30 is a perspective view of the front of a sofa with the slip cover applied thereto.
Figure 31:
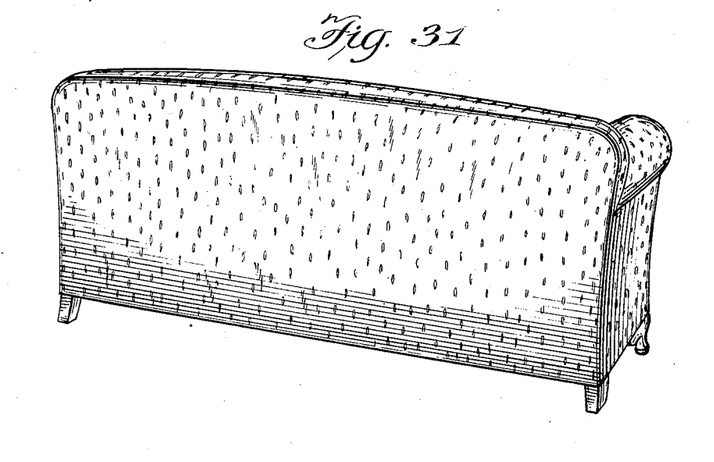
Figure 31 is a rear perspective view of the sofa and slip cover shown in Figure 30.

In Figures 30 and 31 I have shown my novel slip cover applied to a typical sofa. This particular sofa is not provided with separate seat cushions, but it is to be understood that where the sofa, davenport, or similar article has separate seat cushions, a separate envelope is provided for each cushion. Similarly, it will be understood that where my invention is applied to a chair which does not have a separate seat cushion, the seat cushion envelope 50 may be dispensed with.

Because of the extreme adaptability of my novel slip cover, I have found that three styles of sofa covers, each style being made in a single size, will cover practically all styles of multiple upholstered or partially upholstered sofas having backs and arms and which are known variously as sofas, lounges, davenports, etc.

In the appended claims, the expression "upholstered article" and other similar expressions may refer either to a completely upholstered article or to a partially upholstered article. Where a claim describes two or more portions or compartments as being attached, secured or connected to each other or as being continuous, it is to be understood that the particular portions or compartments referred to may be formed either wholly or partially of the same piece of fabric or of separate pieces of fabric sewed or otherwise suitably held together.

The broader aspects of my invention are claimed in my copending application filed October 12, 1936, which discloses and specifically claims a resiliently deformable slip cover having one or more openings provided between adjacent compartments or portions of the slip cover. Various features disclosed but not specifically claimed herein are claimed in my aforesaid copending applications of which this application is a continuation in part.

While I have illustrated and described only a few embodiments of my invention, it is to be understood that my invention may assume numerous forms and that the scope of my invention is to be limited solely by the following claims.

I claim:

1. The combination, with a knitted fabric cover for a chair or other piece of furniture, of cut out portions at predetermined locations in the lower extremities of said cover, elastic members secured along the edges of said cut out portions, and bindings, comprising non-elastic tapes, secured along the remaining lower edges, said bindings terminating in tie strings.

2. The combination, with a knitted fabric cover of the character described, having cut out portions arranged at predetermined positions in its lower extremities, of elastic members secured along their edges to the edges of said cut out portions by overlap stitching, and non-elastic binding tapes, secured by stitching, along the straight edges between said cut out portions of said cover and stitched over the ends of said elastic members.

3. The combination, with a resilient bag-like furniture cover having three or more corners, of elastic members secured to the cover in the lower corners, and non-elastic binding members, secured to the lower edges of the cover, between said elastic members, said binding members terminating at each end in tie strings.

4. The combination with a fabric slip cover for a chair or other piece of furniture, of cut out portions at predetermined locations in the lower extremities of said cover, said portions being at approximately the locations of the chair legs, elastic means for contracting said cut out portions about said legs, non-elastic bindings secured to the remaining lower extremities of said cover, and means for connecting said bindings.

5. The combination of an upholstered article of furniture having a seat, back, and arms so related as to provide re-entrant angles at the junctions of these parts, and a self-conforming bag-like slip cover adapted to fit snugly a multiplicity of such articles varying in shape and size, said cover having a back compartment, arm compartments attached to the back compartment, and a seat portion secured to the inner portions of the back and arm compartments, said compartments and seat portion being continuous and comprising resiliently deformable fabric having a structure tending to adhere to the upholstery, said fabric tucked into said reentrant angles whereby said slip cover is maintained smoothly stretched over said article.

6. A pre-fabricated, self-conforming slip cover adapted to fit closely a multiplicity of similar upholstered articles of furniture of different sizes and shapes, said articles having backs, seats and arms providing reentrant angles, said articles having bases below said seats, said slip cover comprising resiliently distortable fabric and having a back portion capable of surrounding and closely fitting any of said backs, arm portions secured to the back portion and capable of surrounding and closely fitting any of said arms, a seat portion secured to said arm and back portions and capable of closely fitting any of said seats, and a front portion secured to said seat portion and the lower outer sides of said arm portions, said front portion and outer sides of the arm and back portions forming a base portion capable of closely fitting any of said bases, said arm, back and seat portions being continuous and providing excess material capable of being tucked into any of said reentrant angles, said resiliently distortable fabric tending to adhere to the upholstery and thereby hold said slip cover in a distorted shape closely conforming to the shape of any of said articles.

7. The combination with a knitted fabric cover for a chair or other piece of furniture having legs, said cover having cut out portions at predetermined locations in the lower extremities of said cover, said cut out portions being adapted to fit closely about said legs, resiliently contracting means secured to said cut out portions for maintaining said portions closely about said legs, and securing means for said cover, said securing means resisting the contractual forces of said contracting means.

8. The combination of an article of upholstered furniture having legs, and also having a seat, back and arms so related as to provide reentrant angles at the junctions of these parts, and a bag-like slip cover adapted to conform closely to any one of a number of such articles of similar design but somewhat different size and shape of the component parts, said slip cover comprising a self-conforming unitary envelope formed mainly of resiliently distortable material and having connected compartments covering the back, seat and arms of said article, and parts tucked into said reentrant angles, said material having a structure tending to adhere to the upholstery of said article to maintain said cover in place thereon, said cover having corners at locations approximating the locations of said legs, resiliently contractile means in said corners to hold the latter snugly fitting said legs, and securing means for said cover between said corners.

9. The combination of an upholstered article of furniture having a seat, back and arms so related as to provide reentrant angles at the junctions of these parts, said article also having a base and supporting legs, and a self-conforming bag-like slip cover adapted to fit snugly a multiplicity of such articles varying in shape and size, and having an open lower end whereby said cover may be applied to said articles, said cover having a back compartment, arm compartments continuously attached to the back compartment, and a seat portion continuously secured to the inner portions of the back and arm compartments, said cover being made of pieces of knitted textile fabric united by means providing freedom of distortion for said pieces to thereby form a self-conforming whole, said knitted fabric having a structure tending to adhere to the upholstery, said fabric being tucked into said reentrant angles, whereby said slip cover is maintained smoothly stretched over said article, said slip cover having means to hold portions to snugly engage said legs, and securing means located below said base for holding said cover on said article.

10. The combination of an upholstered article of furniture having a seat, back and arms so related as to provide reentrant angles at the junctions of these parts, said article also having a base and legs beneath said base, and a self-conforming bag-like slip cover adapted to fit snugly a multiplicity of such articles varying in shape and size, said cover having a back compartment, arm compartments attached to the back compartment, a seat portion secured to the back and arm compartments, and a front portion secured to said seat portion and arm compartments, said front portion and the lower end of said arm and back compartments forming a base portion adjustable to compensate for variations in the heights of the bases of said articles, said compartments and seat portion being continuous and comprising resiliently deformable fabric having a structure tending to adhere to the upholstery, said fabric being tucked into the reentrant angles, whereby said slip cover is maintained smoothly stretched over said article, and means for securing said base portion in adjusted position.

11. The combination with a knitted bag-like fabric cover having three or more corners and designed for a chair or other piece of furniture having legs, said cover having lower portions adapted to fit closely about said legs, resiliently contracting means secured to said lower portions in the corners thereof for maintaining said portions closely about said legs, and securing means including a draw string in the lower portions of the cover, said securing means resisting the contractual forces of said contracting means.

WALTER L. FRY.